Dec. 13, 1938.    R. V. MORSE    2,140,325
PNEUMATIC JACK
Filed Aug. 3, 1935
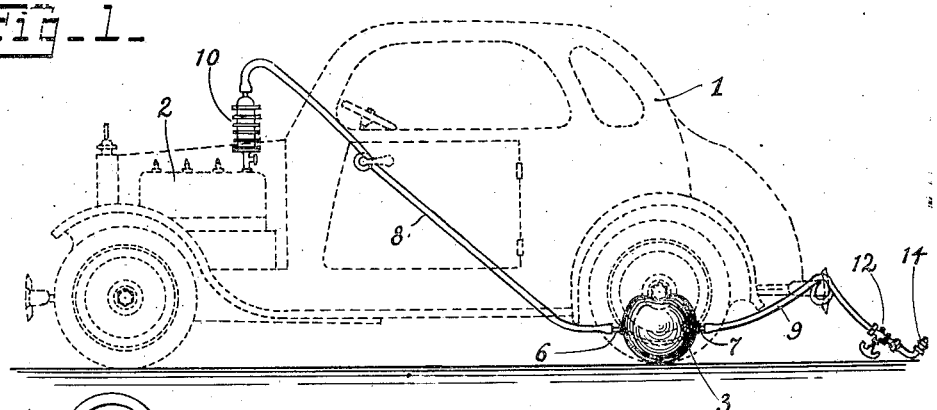
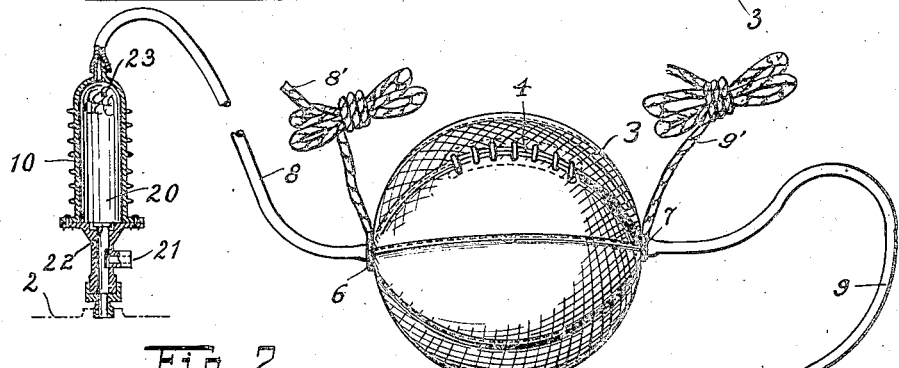
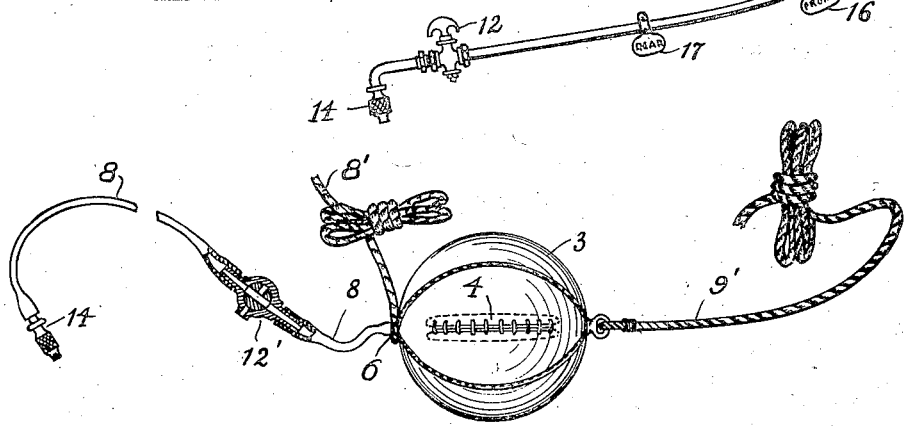
INVENTOR.
Robert V. Morse Patented Dec. 13, 1938

2,140,325

UNITED STATES PATENT OFFICE 2,140,325

PNEUMATIC JACK

Robert V. Morse, Ithaca, N. Y.

Application August 3, 1935, Serial No. 34,507

8 Claims. (Cl. 121—46)

This invention relates to pneumatic jacks, and while it is particularly suitable for automobiles, it can also be applied to various other uses. The objects of the invention are to produce a light and inexpensive jack which can be placed in position with a minimum of effort, and which if desired, can be operated by the engine of the vehicle, or by an ordinary hand pump.

Another object is to provide a jack which does not require a definite base so as to operate satisfactorily in water, mud and soft sand,—and which can also be used to extricate cars under difficult conditions. A further object is to provide means for inflating a tire without recourse to a hand pump. Additional objects will become apparent as the description proceeds and include means for accurately positioning the jack under the axle without kneeling down to look under the car.

Referring now to the drawing forming part of this specification,

Fig. 1 is a general view showing the invention as used in relation to an automobile.

Fig. 2 is a view showing the pneumatic jack on a larger scale.

Fig. 3 shows a modified form in which a rope or chain is used in place of air hose.

Similar reference numerals refer to similar parts throughout the various views.

In the drawing, the reference numeral 1 indicates an automobile having an engine with cylinders 2. The pneumatic jack consists of an inflatable bag 3 preferably made of canvas, duck, leather, or other strong pliable material, and provided with a rubber bladder as in a foot-ball or basket-ball, which can be inserted through the laced opening 4 if desired. Any suitable construction may be used for the bag, as will be apparent to those skilled in the art, and it is possible to make it entirely of rubber without a bladder, though fabric is generally preferable for the exterior as it is less liable to be slippery.

The bag 3 is preferably provided with two stems or hose connections 6 and 7, located at opposite ends of the bag. An intake hose 8 is connected to the stem 6 and an exhaust hose 9 is connected to the stem 7. The hose 8 runs to the air pump 10 which may be of the engine operated type as shown, or any other suitable supply of air pressure, such as a hand pump. The hose 9 has a valve 12 which may be operated by hand, and at the end of the hose 9 is a suitable connection 14 to fit a tire valve stem, so that the air pressure in the bag 3 may be used to inflate a tire if necessary. When a valve 12' is used in the hose 8, a similar connection 14' at the engine end of the hose 8 may be disconnected from the pump and the bag 3 then used to inflate a tire using the hose 8 in place of the hose 9, if desired; or the hose 8 may be disconnected at the point 6 and connected direct to the tire. The connection 14 may be placed on the end of a length of hose, but is preferably made a part of the valve 12 assembly, for reasons of economy and convenience.

In addition to providing a means for inflating the tires, the two hoses 8 and 9 attached to opposite ends of the bag 3 have a special function in placing and positioning the jack, as well as transmitting air. With prior jacks of the portable type, such as are ordinarily furnished with automobiles, it has been necessary to bend over or kneel down to push the jack under the car, a fatiguing operation for elderly or stout people, and one which is liable to soil ladies' clothes, particularly if the ground is wet or dusty. It is also difficult to see just when the jack is directly under the axle, particularly with rear wheels of modern cars, which have a long over-hang and bumpers. Furthermore, it is practically impossible to jack up a car that is mired in mud or soft sand, where there is no broad hard foundation available, as the base of an ordinary jack sinks down into the ground when load is put upon it.

With the present invention, the combination of the bag and the two hoses function as follows. The user takes the hose 9, throws it down on the ground on the near side of the flat tire, and with a swinging motion snaps the free end of the hose 9 around to the far side of the flat tire. The weight of the valve 12 assists in this, and the hose 9 and valve 12 can easily be thrown so that its free end can be picked up again after passing back of the flat tire. The hose 9 is then used as a rope to drag the bag 3 into position under the axle. If it is pulled too far, it can be dragged back by pulling on the other hose 8 which is attached to the other end of the bag 3. The two hoses then serve by tension means alone to position the bag, doing away with rods which have to be pushed.

In order that it shall not be necessary to look under the car to see when the bag is properly located, indicating tags 16 and 17 are provided on the air hose 9, one tag 16 marked "Front" and the other tag 17 marked "Rear"; or only one tag may be used, for the rear, as it is easier to see the front axle. These tags are adjustable to suitable positions on the hose 9, and by measuring off the distance from the axle to the bumper by placing the middle of the bag 3 opposite the hub and laying the hose 9 along outside the wheel before the jack is put into use, and then setting the tag accordingly, it is merely necessary then to pull the hose 9 until the tag reaches the bumper in order to place the bag 3 directly under the axle.

The bag 3 is of course in a deflated condition when placed under the axle. The hose 9 is then tied or wound around the bumper, and the hose 8 is tied or wound around any convenient object, such as another wheel hub, door handle or steering post. The two hoses 8 and 9 thus serve to hold the bag 3 securely in the proper position, so that when inflated it will not slip from under the axle.

An alternative form is shown in Fig. 3, in which a rope or chain 9' is used in place of the hose 9, and a two way air valve 12' is located in the hose 8, which can be turned to either close off the ingoing air or to permit the air to escape after the tire is changed; or the valve 12' may be omitted entirely and the operations controlled directly from the engine. This is somewhat cheaper, but is not so convenient for inflating tires and other purposes. An additional rope or ropes 8' may also be used to perform the tension member function of the hose 8 attached at the point 6, in which case the hose 8 may be of a lighter and cheaper grade, functioning merely to transmit the air. This is also shown in Fig. 2, where similar ropes 8' and 9' may be used for the same purpose, when a lighter and cheaper grade of hose is desired. By using a flexible bag instead of a rigid chamber, and pure tension means to move and secure it, the weight of the apparatus is reduced to a minimum, and it may be readily folded, carried, and packed. I am aware that jacks raised by air pressure are not new, but they have previously been pushed in place by hand, or by a long rod or handle. I believe I am the first to produce a pneumatic jack in which the positioning, securing, and lifting elements are all flexible tension members, thus producing a light jack which can function with a minimum of physical effort, and without requiring the person to push it under the car.

The location of the ropes or tension means is immaterial, so long as they permit pulling in both directions. The air hose may also enter the bag at any convenient point. For example, one point may be near the lacing if desired, and the other opposite. One of the cheapest forms consists of a fabric bag having a good quality rubber bladder, two light ropes attached to opposite sides, and a light air hose for inflation purposes only, the latter not being strong enough to use as a tensioning member.

The air pump 10 is similar to the engine compression pumps now on the market for spray painting, tire inflation, etc. One illustrative form 10 consists of a chamber 20, a valve 21 for admitting air on the suction stroke of the engine 2, and a valve 22 through which the air is forced on the compression stroke of the engine. While the air is usually pure in a well designed pump, filtering material 23 may be added if desired to absorb traces of oil. The particular form and construction of the pump is immaterial so far as the present invention is concerned, as many suitable types are available.

The device described may also be used to move cars out of the mire, lift other objects, operate painting and spraying devices, and various other purposes.

While I have in the foregoing described certain specific examples, it will be understood that they are merely for purposes of illustration, to make clear the principles of the invention, which is not limited to the particular forms shown, but is susceptible to various modifications and adaptations in different installations, as will be apparent to those skilled in the art, without departing from the scope of the invenion as stated in the following claims.

I claim:

1. A pneumatic jack, comprising in combination an inflatable bag having a hose connection at one end and another hose connection at the opposite end, and an intake hose adapted to be connected to one end of said bag and an exhaust hose adapted to be connected to the other end of said bag, means for connecting one end of the intake hose to a pump, and a control valve at the other end of the exhaust hose whereby a jack is constructed substantially entirely of flexible materials in tension, so as to be of minimum weight for a given lifting power.

2. In a pneumatic jack, the combination of an inflatable bag, means for inflating said bag, means for deflating said bag, and flexible tension means for pulling said bag into place under the axle of an automobile and securing it against displacement when in use, whereby an automobile may be raised and lowered by inflation and deflation of the bag whereby a jack is constructed substantially entirely of flexible materials in tension, so as to be of minimum weight for a given lifting power.

3. In a pneumatic jack, the combination of an inflatable bag, means for inflating said bag, means for deflating said bag, flexible tension means for pulling said bag into place under the axle of an automobile and securing it against displacement when in use, and indicating means on said tension means to show when the bag is in position under the axle whereby a jack is constructed substantially entirely of flexible materials in tension, so as to be of minimum weight for a given lifting power.

4. Means for lifting automobiles, comprising in combination a pump adapted to be operated by the engine of the automobile, a hose leading from said pump of sufficient length to reach to either axle of the automobile, an inflatable bag connected to said hose, a second hose extending from said bag whereby it may when deflated be pulled into place under the axle, said second hose being of such length that it may be used to secure the bag in place under the axle, and means for controlling the inflation and deflation of said bag whereby a jack is constructed substantially entirely of flexible materials in tension, so as to be of minimum weight for a given lifting power.

5. In a pneumatic jack for automobiles, the combination of a source of pressure, a hose leading from said source of pressure, said hose being long enough to reach from the automobile engine to either axle of the automobile, an inflatable bag connected to said hose, said bag having a roughened outer surface so as to present considerable frictional resistance to slipping, and flexible tension means in addition to said hose also attached to the bag, whereby the bag may be pulled into place when deflated and secured against displacement when inflated whereby a jack is constructed substantially entirely of flexible materials in tension, so as to be of minimum weight for a given lifting power.

6. In a pneumatic jack, the combination of an inflatable bag, means for inflating said bag, and ropes attached to said bag by which it may be drawn into position and secured in place, whereby it may be positioned under a car by tension means alone whereby a jack is constructed substantially entirely of flexible materials in tension, so as to be of minimum weight for a given lifting power.

7. In a pneumatic jack, the combination of an inflatable bag, means for inflating said bag, and a plurality of tension means attached to said bag so that it may be drawn in either direction to place it under a car whereby a jack is constructed substantially entirely of flexible materials in tension, so as to be of minimum weight for a given lifting power.

8. In a pneumatic jack, the combination of an inflatable bag having a roughened exterior surface, a hose for inflating said bag, and tension means attached to said bag so that it may be drawn in either direction to locate it in place whereby a jack is constructed substantially entirely of flexible materials in tension, so as to be of minimum weight for a given lifting power.

ROBERT V. MORSE.